June 19, 1934.  J. D. STIRISS  1,963,455
MOVING PICTURE PROJECTOR
Filed March 14, 1933
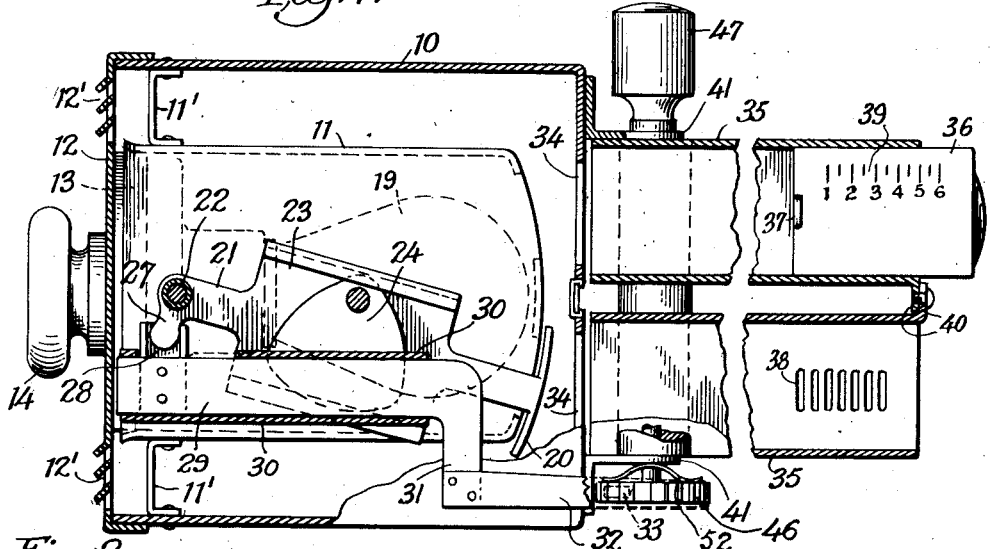
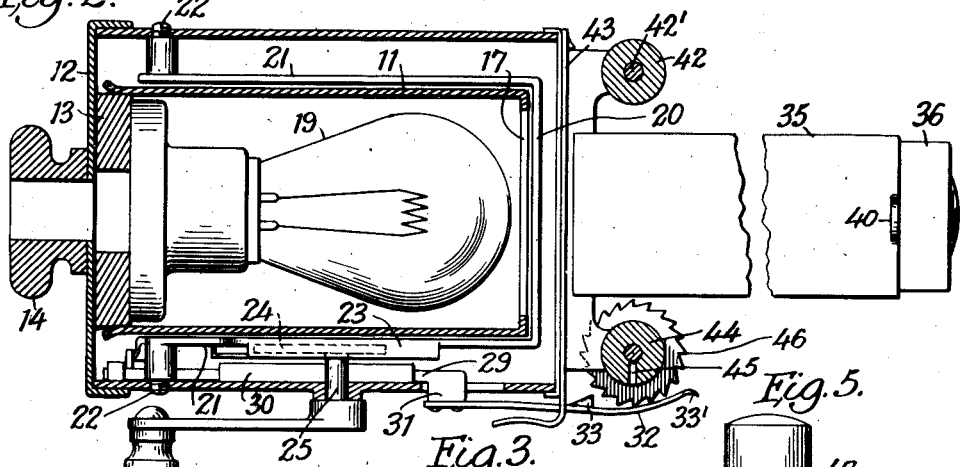
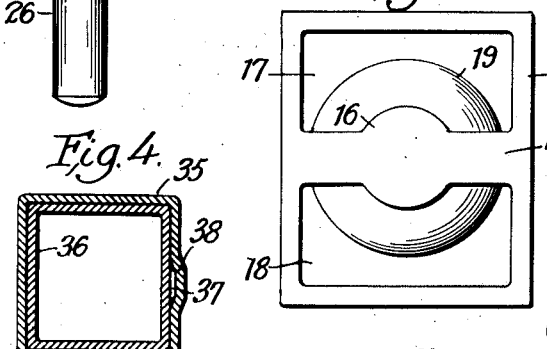
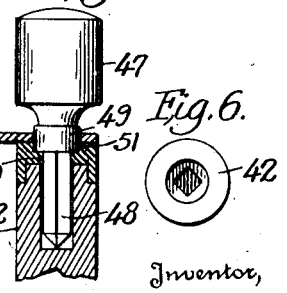
Inventor,
Jacob D. Stiriss,
By James F. Duhamel,
Attorney.

Patented June 19, 1934

1,963,455

UNITED STATES PATENT OFFICE 1,963,455

MOVING PICTURE PROJECTOR

Jacob D. Stiriss, New York, N. Y., assignor to Durable Toy Novelty Company, New York, N. Y., a corporation of New York Application March 14, 1933, Serial No. 660,700

5 Claims. (Cl. 88—16.6)

This invention relates to moving picture projectors and is an improvement on the apparatus of a similar nature for which an application for patent was filed in the United States Patent Office by applicant December 30, 1932, and bearing Serial No. 649,630.

The object of the present invention is to provide a simple and substantial synchronizing means for the operation of the shutter and the winding spool and by a direct drive of the latter so that any abnormal resistance on the part of said winding spool may be detected by the operator, means for the immediate rewinding of the film and without disconnecting or loosening any part of the projector, means for diffusing the light rays from the lamp so that they will not center at one spot and whereby flickering is prevented, means by which the lenses may be readily cleaned and properly adjusted, and an improvement in the pivot for the film carrying spool by which it may be readily released.

These and other details and objects of the invention are more fully described in the following specification, set forth in the claims and illustrated in the accompanying drawing, wherein:

Figure 1 is a vertical sectional view through part of one side of the projector and through the projecting tubes.

Fig. 2 is a horizontal sectional view through the projector.

Fig. 3 is a front view of the lamp box.

Fig. 4 is a cross-sectional view through one of the lens tubes.

Fig. 5 is a sectional view through the upper end of the film spool.

Fig. 6 is a plan view of the upper end of said spool.

The projector comprises the housing 10 containing the lamp box 11 and secured thereto by the supports 11' and the housing has the removable end 12 and a lamp supporting block 13 and the end 12 also has a perforated knob 14 to manipulate same and to admit the electric wiring, said end also has ventilating openings 12.

The front end of the box 11 is opened but has a central crosspiece 15 with a disc 16 leaving the apertures 17 and 18 to permit the passage of light from the lamp 19 but to arrest the glare from the incandescent filament. The interior of the lamp box has reflecting surfaces for the light rays whose only outlets are the apertures 17 and 18 while its front edges are flared to fit over the block 13.

The shutter 20 is adapted to intermittently move over the openings 17 and 18 and it is a yoke carried by the arms 21 that are pivoted to the housing 10 at 22 and on one of the arms 21 is a slide 23 in which works a cam 24 carried by a shaft 25 that is journalled in the housing and has on the outside thereof the crank arm and handle 26. As the cam 24 is rotated the shutter is moved up and down closing and opening the apertures 17 and 18.

Depending from one of the arms 21 is a short arm 27 playing in a fork 28 at the end of a bar 29, carried in guide ways 30 secured to the inside of the housing, and having at its forward end an arm 31 that extends downward and out through a slot in the housing and has a pawl 32 made of spring metal and having a tooth 33 and a non-engaging curved end 33'.

In the front end of the housing 10 are openings 34 admitting the light rays to the projector tubes 35 located a short distance from the front wall of the housing and having at their outer ends the lens holders 36 that are telescopic therein and held at desired points by a tooth 37 that fits into one of the indents 38 in the inside of the projecting tube 35, as best shown in Figs. 1 and 4.

The outer face of the lens holders may also contain gradations 39 to indicate the position of the tubes so that they may be returned to their proper focal distance from the film. Each of the tubes 35 has a flange 40 by which they may be connected to brace them against dislocation.

The tubes 35 are supported by brackets 41 with sufficient clearance from the front of the housing to permit the passage of the film that is carried by a spool 42 and that is initially carried through the clearance by the hook 43 and appropriately attached to the winding spool 44 by means of the slot 45 into which the end of the film is inserted.

Both of the spools are journalled in the brackets 41, the spool 44 having on its shaft at the lower end a ratchet wheel 46 which is engaged by the pawl tooth 33 and advanced when the slide 29 is moved forward by the arm 27, thus giving the film an intermittent movement from one spool to the other and moving synchronously with the shutter 20.

When the end of the film has been reached and it is desired to rewind same on spool 42 the knob 47 is used to rotate same. This knob 47 has a squared shank 48 and a cylindrical shoulder 49 to fit in corresponding sockets 50 and 51 in the upper end of the spool 42, the shoulder 49 also acting as the journal in the bracket 41. If it is desired to remove the spool after the film has been rewound the knob 47 is used to withdraw the shank 48 when the spool will be freed. The lower end of spool 42 has a journal pin 42'.

The spool 44 is afforded some resistance against backlashing by means of the spring 52 that is interposed between the ratchet wheel 46 and its adjacent bracket 41.

With a projector thus constructed the lamp may be easily removed or replaced and the parts may be repaired readily. The lens may be quickly removed or adjusted and the film easily removed and another substituted, while the movement of the shutter and the feed spool are co-ordinated by very simple and substantial means and any resistance in the movement of the winding spool is immediately evident and is felt by the operator while the light is distributed evenly minimizing fluttering.

The re-winding of the film may be immediately resorted to without disconnecting or changing any of the operating parts and it is evident that they may be modified or otherwise arranged without departing from the essential features above described or from the scope of the appended claims.

What I claim as new is:

1. In moving picture projectors, the combination of a housing, a removable end having ventilator openings, a lamp box carried by the removable end and having front openings, a bar between said openings and across the center of the lamp box, projector tubes alined with the latter openings, a shutter adapted to reciprocate between the said openings and the projector tubes, and means for actuating the shutter.

2. In moving picture projectors, the combination of a housing having a removable end and opposite projection openings, a lamp box secured to the housing and having an interior reflecting surface and openings at its forward end, a bar across the forward end between the said openings, tubes carrying lenses at the projector openings, a shutter carried by arms pivoted to the housing, a slide on the side of the shutter, a cam operating in the same to reciprocate the shutter, a shaft for the cam and journalled in the side of the housing, and a crank arm for operating the shaft and cam.

3. In moving picture projectors, the combination of a housing having projection openings, a removable opposite end to said openings, a lamp box secured to the housing and having openings coinciding with the openings of the said housing, a shutter pivoted to the housing and adapted to reciprocate between the openings of the lamp box and of the housing, a slide on the shutter, a cam operating in the same, a reciprocating bar on the inside of the housing, an arm at the pivot of the shutter engaging and actuating the bar, a spool at the outside of the housing, a ratchet wheel connected with the same, and a pawl at the end of the said bar and actuating the ratchet wheel.

4. In moving picture projectors, the combination of a housing having projection openings, projector tubes at said openings, a film carrying spool at one side of the tubes, a winding spool at the other side of the tubes, a ratchet wheel on the latter spool, a lamp box within the housing, a shutter reciprocating between the lamp box and the projection openings, pivoted arms carrying the shutter, a reciprocating bar at the side of the housing, an arm at the pivot of the adjacent shutter arm engaging and actuating the bar, and a pawl at the end of the bar and adapted to operate and turn the ratchet wheel on the winding spool.

5. In moving picture projectors, the combination of a housing having openings, projector tubes at the openings and having indents, a lens holder for each tube, a tooth on each of said holders and adapted to engage an indent, spools at each side of the said tubes and adapted to carry a film between the openings of the housing and the projector tubes, brackets carrying the spools and tubes, a ratchet on one of the spools, a pin on the other spool to rotate same and to secure it in one of the brackets, a shutter alternately closing one or the other openings in the housing, a reciprocating bar operated by the shutter, a pawl on said bar to intermittently rotate the ratchet, a cam operated from the outside of the housing to actuate the shutter, and gradations on the lens holders.

JACOB D. STIRISS.